United States Patent [19]
Link et al.

[11] Patent Number: 6,085,622
[45] Date of Patent: Jul. 11, 2000

[54] MACHINE TOOL

[75] Inventors: Helmut Friedrich Link, Aichwald; Guenther Heinrich Trautmann, Kirchheim-Nabern, both of Germany

[73] Assignee: Index-Werke GmbH & Co. KG Hahn & Tessky, Esslingen, Germany

[21] Appl. No.: 09/196,708

[22] Filed: Nov. 20, 1998

[30] Foreign Application Priority Data

Sep. 10, 1998 [DE] Germany .......................... 198 41 449

[51] Int. Cl.⁷ .................................................. B23B 3/20
[52] U.S. Cl. ................................ 82/122; 82/129; 82/147; 82/149
[58] Field of Search ............................. 82/129, 122, 125, 82/123, 132, 147, 137, 138, 149

[56] References Cited

U.S. PATENT DOCUMENTS

| | | | |
|---|---|---|---|
| 2,635,325 | 4/1953 | Walder | 82/132 |
| 3,260,140 | 7/1966 | Burge | 82/122 |
| 5,697,270 | 12/1997 | Link | 82/129 |

FOREIGN PATENT DOCUMENTS

0 785 040   7/1997   European Pat. Off. .

Primary Examiner—Henry W. H. Tsai
Attorney, Agent, or Firm—Barry R. Lipsitz

[57] ABSTRACT

In order to improve a machine tool comprising a machine frame with an underframe and a machine column seated on this and having a support ring, a support mounted on the support ring for rotation about an essentially vertical axis, several workpiece receiving chucks for workpieces to be machined arranged on the support, an operating area extending around the vertical axis, and a plurality of stations arranged on the machine frame in the region of the operating area, the workpiece receiving chucks being positionable in these stations during a machining cycle, such that the machine frame has as great a rigidity as possible with as expedient a construction as possible it is suggested that the machine column have a reinforcement casing fixing the support ring in relation to the underframe, this casing extending outside the operating area and surrounding it at least partially, that the reinforcement casing comprise casing supporting structure elements which are located in a casing surface extending around the vertical axis, absorb forces acting in this casing surface and transferred from the support ring in a manner rigid against deformation and are connected with one another to form a casing surface supporting structure rigid against deformation.

35 Claims, 6 Drawing Sheets

MACHINE TOOL

BACKGROUND OF THE INVENTION

The invention relates to a machine tool comprising a machine frame with an underframe and a machine column ("machine stand") seated on this and having a support ring, a support ("carrier") mounted on the support ring for rotation about an essentially vertical axis, several workpiece receiving means for the workpieces to be machined arranged on the support, an operating space which extends around the vertical axis and in which the workpiece receiving means can be moved around the vertical axis due to rotation of the support, and a plurality of stations which are arranged on the machine frame in the region of the operating area and in which the workpiece receiving means can be positioned during a machining cycle.

Machine tools of this type are known from the state of the art. Such a machine tool is described, for example, in German patent application 195 04 369.3-14.

In the case of machine tools of this type there is the problem that the support has, together with the workpiece receiving means, a very large mass which is accelerated, on the one hand, and braked, on the other hand, during passage through the individual stations and so the machine frame, in particular, the machine column itself must absorb considerable forces acting in azimuthal direction in relation to the vertical axis.

In addition, there is not only the problem of absorbing the considerable forces acting in azimuthal direction during the acceleration and braking of the support but also the problem of positioning the support together with the workpiece receiving means in the individual stations with great precision and great rigidity in order to attain a high precision during the machining of the workpieces in the individual stations.

SUMMARY OF THE INVENTION

In the known solution it is provided for the machine column to be constructed by way of ribs extending in radial planes in relation to the axis, these ribs supporting the support ring. Such a solution can be realized with the required rigidity only with considerable resources.

For this reason, the object underlying the invention is to improve a machine tool of the generic type such that the machine frame has as great a rigidity as possible with as expedient a construction as possible.

This object is accomplished in accordance with the invention, in a machine tool of the type described at the outset, in that the machine column has a reinforcement casing fixing the support ring in relation to the underframe, this casing extending outside the operating area and surrounding it at least partially, that the reinforcement casing comprises casing supporting structure elements which are located in a casing surface extending around the vertical axis, absorb forces acting in this casing surface and transferred from the support ring in a manner rigid against deformation and are connected with one another to form a casing surface supporting structure rigid against deformation.

The core of the inventive solution is thus to be seen in giving the machine column a considerable rigidity against all possible forces occurring at the support ring in that these are absorbed by a reinforcement casing which is designed as a casing surface supporting structure, extends outside the operating area and surrounds this at least partially so that, on the one hand, the forces acting in azimuthal direction in relation to the vertical axis are intercepted at a considerable distance from the vertical axis and at this considerable radial distance from the vertical axis may be passed into the underframe in a simple manner through the casing surface supporting structure.

When a reinforcement casing surrounding the operating area is provided, it would, in principle, be possible to have access to the operating area in a vertical direction not only from above but also from below. Such access is, however, not satisfactory.

For this reason, a particularly advantageous embodiment provides for the reinforcement casing to have several openings, via which the operating area is accessible.

In this respect, it is preferably provided for the operating area to be accessible exclusively via the openings in the reinforcement casing so that the openings have to have a sufficient size in order to be able to carry out all the manipulations necessary in the operating area, in particular, to be able to equip the individual stations adequately with tools and also to be able to move the workpiece out of the operating area or into it in a loading and/or unloading station.

In this respect, it is particularly favorable when an opening in the reinforcement casing is associated with each station so that each of the stations is accessible individually.

A particularly advantageous embodiment of an inventive machine tool provides, for example, for the stations to comprise machining stations and for a tool carrier provided in each machining station to be accessible therein from the outside via one of the openings.

It would, in principle, be possible to provide accessibility to several stations via one opening.

For reasons of as great a stability of the reinforcement casing as possible it is, however, advantageously provided for each machining station to have its own opening associated with it in order to provide accessibility to the tool carrier.

Alternatively or supplementary hereto, a further preferred embodiment provides for the stations to comprise a loading and/or unloading station and for a workpiece transport unit to extend through the opening in the loading and/or unloading station. In this case, the opening is dimensioned such that the entire workpiece transport unit can pass through the opening during operation of the machine tool.

One particularly advantageous embodiment provides, in particular, for a single enlarged opening to be provided for a loading station and an unloading station arranged next to this, this opening facilitating arrangement of the corresponding workpiece transport unit.

Preferably, a single opening is associated with the loading station and the unloading station located next to this and this opening could, for example, extend over two casing supporting structure elements. However, a single casing supporting structure element is expediently associated with this single opening.

With respect to the design of the casing supporting structure elements, no further details have been given in conjunction with the preceding explanations concerning the individual embodiments. One advantageous embodiment of an inventive machine tool, for example, provides for each of the casing supporting structure elements to extend at least partially around one of the openings and thus be in a position to guide the forces around the opening in a simple manner and display the required rigidity against deformation.

A particularly favorable solution of an inventive machine tool provides for each casing supporting structure element to comprise connected flat struts extending areally parallel to the casing surface.

The flat struts could, in principle, be designed in the shape of a grid structure or grid supporting framework structure. A particularly simple solution from a constructional point of view does, however, provide for the flat struts to have uninterrupted surfaces within their outer contour, i.e. they are flat material parts which are simple to produce, extend with their flat sides parallel to the casing but are designed to be rigid in relation to forces acting in the casing surface as a result of their extension in the direction of the casing surface.

In principle, it would be possible to fit, for example, screw a casing supporting structure element together from several flat struts. It has, however, proven to be particularly favorable from a constructional point of view and also particularly favorable, especially, with respect to the rigidity against deformation when the flat struts of each casing supporting structure element form a connected, integral part which has a particularly high rigidity against deformation on account of its integrality.

With respect to the type of design of the casing surface, no further details have been given in conjunction with the preceding explanations concerning the inventive casing surface supporting structure. One advantageous embodiment, for example, provides for at least one section of the casing surface to be designed, at least over part of the circumference of the reinforcement casing, similar to an area of a surface prismatically parallel to the axis, i.e., the surface extends essentially parallel to the axis, wherein the base surface of such a prismatic surface can have any optional shape. For example, it would be possible to use a circular shape or a rectangular shape or at least in part the shape of a regular polygon as the basis for the base surface.

Alternatively or supplementary thereto, one advantageous embodiment provides for at least one section of the casing surface to be designed, at least over part of the circumference of the reinforcement casing, similar to an area of a conical surface with a cone axis extending parallel to the vertical axis. Such a solution has the advantage that a conical surface ensures a particular stability not only against forces acting in azimuthal direction but also against forces acting transversely to the axis. In this respect, the cone axis can preferably coincide with the vertical axis of the machine tool.

The most varied of base surfaces are conceivable in the case of a conical surface, as well. For example, circular surfaces, polygonal surfaces can be realized as conceivable base surfaces or in part base surfaces in the form of a regular polygon.

A particularly preferred solution provides for the casing surface to have a polygonal base surface which continues in edges in the casing surfaces extending away from the base surface so that, altogether, the casing surface is formed by casing pieces which extend in planes between the edges, may, on the one hand, be realized in a mechanically simple manner and, in particular, offer additional advantages to the extent that they not only create a high rigidity against forces acting in azimuthal direction but also a high rigidity against forces acting transversely to the cone axis.

A particularly favorable form provides for part of the base surface of the casing surface to have the shape of a regular polygon since a regular polygon, in particular, may be adapted favorably to a machine, in which stations of the support arranged at constant angular distances from one another are provided.

With respect to the allocation of the casing supporting structure elements to a casing having a polygonal base surface, no further details have so far been given. A casing supporting structure element could, for example, extend over several edges of a polygon. A particularly favorable adaptation of the several casing supporting structure elements to a polygonal base surface of the casing surface does, however, provide for one casing supporting structure element to extend each time between two corners of the polygonal base surface following one another in circumferential direction, i.e. a casing supporting structure element forms each time one side edge of the polygonal base surface. Such a construction may be configured particularly favorably with the desired rigidity against deformation.

In conjunction with the preceding explanations concerning the individual embodiments of the inventive solution, it has merely been assumed that the machine column comprises one casing surface supporting structure which ensures adequate rigidity against deformation for this. Such a machine column can be realized in this form. The casing surface supporting structure must, in this case, however, be configured such that it also absorbs considerable forces extending in vertical direction, i.e. in the direction of the vertical axis and also considerable forces extending transversely to the vertical axis. In order, in this respect, to obtain a greater degree of freedom for the design of the casing surface supporting structure and in order to adapt the machine column to the active forces in an optimum manner with regard to its shape, it is particularly advantageous when the support ring is, in addition to the casing surface supporting structure, held in a fixed position in relation to the underframe by transverse supporting structure elements which extend in transverse planes extending parallel to the vertical axis and transversely to the casing surface and absorb forces acting in these transverse planes and transferred from the support ring in a manner rigid against deformation. These transverse supporting structure elements are particularly suitable for absorbing forces acting in a vertical direction and transversely to the vertical axis in a simple manner so that, as a result, an additional reinforcement of the casing surface supporting structure is possible with simple means and thus the casing surface supporting structure can also be at least partially relieved from acting forces, for which this is only limitedly suitable.

In this respect, it is particularly favorable when the transverse planes extend parallel to radial directions in relation to the vertical axis in order, in particular, to absorb forces acting transversely to this vertical axis in a suitable manner.

A particularly high stability of the transverse supporting structure elements can be achieved when these extend areally parallel to the transverse planes.

Transverse supporting structure elements of this type could preferably be designed in a grid or strut type of construction.

A particularly favorable realization of the transverse supporting structure elements provides for these to be designed as closed wall elements since high transverse forces can be transferred with such closed wall elements in a simple manner and such closed wall elements are also very simple to produce.

With respect to the connection of the transverse supporting structure elements to the casing surface supporting structure, the most varied of solutions are conceivable. It would be conceivable, for example, to connect the transverse supporting structure elements to the casing surface supporting structure by means of screw connections or similar, form-locking connections. One particularly favorable solution provides for the transverse supporting structure elements to be integrally connected to the casing surface supporting structure.

With respect to the arrangement of the transverse supporting structure elements, no further details have been given in conjunction with the preceding explanations concerning the individual embodiments.

It is, in principle, possible to arrange the transverse supporting structure elements at optional locations as long as these do not cause any restriction of the operating area and also do not hinder the accessibility to the openings. It is, however, particularly favorable when the transverse supporting structure elements are respectively arranged between two stations of the machine tool in azimuthal direction in relation to the vertical axis and thereby cause no restriction whatsoever of the operating area available in the region of the individual stations.

In this respect, it is not absolutely necessary for such a transverse supporting structure element to be arranged between each station. It is even favorable in many cases not to arrange such a transverse supporting structure element between two consecutive stations insofar as this hinders manipulation of the workpiece in these two stations.

One advantageous solution does, however, provide for at least several transverse supporting structure elements to be provided and for such transverse supporting structure elements to be expediently provided at constant angular distances, for example, following two consecutive stations each time.

In principle, transverse supporting structure elements of this type are of little hindrance when these are arranged between successive machining stations since, as a rule, no additional manipulation of the workpiece, for which transverse supporting structure elements can cause interference, takes place between successive machining stations.

With respect to the arrangement of the transverse supporting structure elements, no further details have been given in conjunction with the preceding explanations concerning machine tools with these elements. It would be conceivable, in principle, to provide the transverse supporting structure elements so as to be located radially outwards on the casing surface supporting structure. However, transverse supporting structure elements of this type would increase the measurements of the machine tool when it is assumed that the distance of the casing surface supporting structure from the vertical axis is determined by the elements provided in the operating area.

A particularly compact solution of the inventive machine tool can be realized when the transverse supporting structure elements are arranged within the casing surface supporting structure since, in this case, the casing surface supporting structure determines the maximum external measurements of the machine frame.

In this case, in particular, the provision of surface supporting structures may be advantageously combined with the arrangement thereof between individual stations when such transverse supporting structure elements arranged within the casing surface supporting structure are arranged between individual machining stations since, in this case, the transverse supporting structure elements can serve at the same time, at least partly, for the spatial separation of the individual machining stations from one another and also partly serve for already forming a chippings protection between individual machining stations.

With respect to the design of the casing surface supporting structure, it has merely been assumed in conjunction with the embodiments described thus far that this is formed by casing supporting structure elements.

An additional reinforcement of the casing surface supporting structure, particularly when this has a casing surface rising above a polygonal base surface, provides for the casing surface supporting structure to be provided with reinforcing struts extending at least partially in azimuthal direction, wherein reinforcing struts of this type are provided in addition to the casing supporting structure elements and project away from the casing supporting structure elements in a radial direction and are thereby arranged either on an inner side facing the vertical axis or an outer side remote from the vertical axis.

A particularly favorable effect of such reinforcing struts can be achieved when these are located in a plane extending transversely to the vertical axis since an improved rigidity against deformation of the casing surface supporting structure against expansions in radial direction in relation to the vertical axis can be achieved with such reinforcing struts.

In this respect it is particularly favorable when the reinforcing struts each extend as far as the transverse supporting structure elements and are connected to them so that the reinforcing struts not only stabilize the casing surface supporting structure but also, at the same time, effect a reinforcement of the transverse supporting structure elements relative to one another.

Reinforcing struts of this type can, in principle, be connected in addition to the casing surface supporting structure, for example, by form-locking elements. A particularly favorable solution does, however, provide for the reinforcing struts to be integrally connected to the casing surface supporting structure and thus ensure a maximum stability for it.

It is even more advantageous when the reinforcing struts are, in addition, integrally connected to the transverse supporting structure elements and thus also give these an optimum reinforcement relative to one another.

With respect to the dimensioning of the machine column itself, no further details have been given in conjunction with the preceding explanations concerning the individual embodiments. The machine column could, for example, be optionally dimensioned as long as this ensures, altogether, an adequate rigidity against deformation in relation to all the forces occurring.

The deformation behavior of the machine column can, however, be configured particularly advantageously, even with the greatest rigidity against deformation, when the machine column is dimensioned such that it has with respect to its rigidity a multiply symmetry in relation to the vertical axis so that the forces acting in azimuthal direction on the support ring, in particular, do not cause any asymmetric deformation of the machine column in relation to the vertical axis but, on account of the multiple symmetry, a deformation which is symmetric to the vertical axis and is expedient, in particular, for the precision of the positioning of the workpiece receiving means in the individual stations after turning of the support relative to the machine frame.

In the preceding explanations concerning the inventive machine tool, it has not be defined in detail how the workpiece receiving means are intended to be designed. It would be conceivable, for example, to configure the workpiece receiving means as workpiece holding means, with which workpieces may be fixed on the support and then moved into the individual stations.

A particularly advantageous embodiment does, however, provide for the workpiece receiving means to be movable in an essentially vertical direction. With such workpiece receiving means movable in an essentially vertical direction it is possible to take up workpieces from workpiece transport means or deposit them on workpiece transport means. This means that an exclusively vertical movability of the workpiece receiving means is not absolutely necessary but the direction of movement of the workpiece receiving means can also form an acute angle with the vertical.

It is, however, particularly advantageous when the workpiece receiving means are movable in a vertical direction relative to the support.

In this respect, it is particularly favorable when the workpiece receiving means are movable in a direction parallel to the vertical axis.

With respect to the workpiece receiving means themselves, one particularly favorable solution provides for the workpiece receiving means to be designed as workpiece spindles which create the possibility of not only holding the workpieces and moving them into the individual stations as a result of movement of the support but also of turning the workpieces themselves and thus carrying out turning operations in the individual stations in a simple manner.

In this respect, the spindle axes of the workpiece spindles are preferably arranged such that they extend parallel to the direction of movement of the workpiece receiving means relative to the support.

The movements of the workpiece receiving means relative to the support can be realized, in principle, in any optional manner. It is particularly favorable when the movement of the workpiece receiving means relative to the support takes place as a numerically controlled axis movement.

For reasons of as high a precision as possible of the positioning of the workpiece receiving means relative to the machine frame, it has proven to be particularly favorable when the workpiece receiving means are movable relative to the support linearly and exclusively in one direction which does not, however, preclude a rotation of the workpiece receiving means, for example, about a spindle axis or about a multiple positioning axis.

With respect to the arrangement of tools for the machining of the workpieces, no further details have so far been given. It is preferably provided for at least some of the stations to be designed as machining stations with at least one tool.

In this respect, this tool is preferably either arranged stationarily or movable in at least one direction transversely to the vertical axis in order to improve the machining possibilities.

The tool carriers are, in principle, not arranged on the machine frame so as to be rotatable with the support but are, with respect to the rotation of the support, non-rotatably connected to the machine frame. In this respect, it would be conceivable, for example, to fix the tool carriers of the machining stations in position on the machine column.

However, in order to keep the machine column free from additional stresses as a result of tool carriers arranged on it, it is preferably provided for the tool carriers for the tools to be arranged on the underframe.

In this respect, it is preferably provided for the underframe to bear the tool carriers.

In the simplest case, it is provided for the underframe to be provided with support desks for the tool carriers.

The tool carriers can, in principle, be designed in the most varied of ways. One advantageous type of design of a tool carrier provides for this to be designed as a tool slide which allows a simple positioning of the tool relative to the respective machine station, in which the tool is available for the machining.

The slides are preferably provided with at least one numerically controlled axis, in particular, a linear axis.

Additional features and advantages of the inventive solution are the subject matter of the following description as well as the drawings illustrating one embodiment.

DETAILED DESCRIPTION OF THE INVENTION

Figure 1:
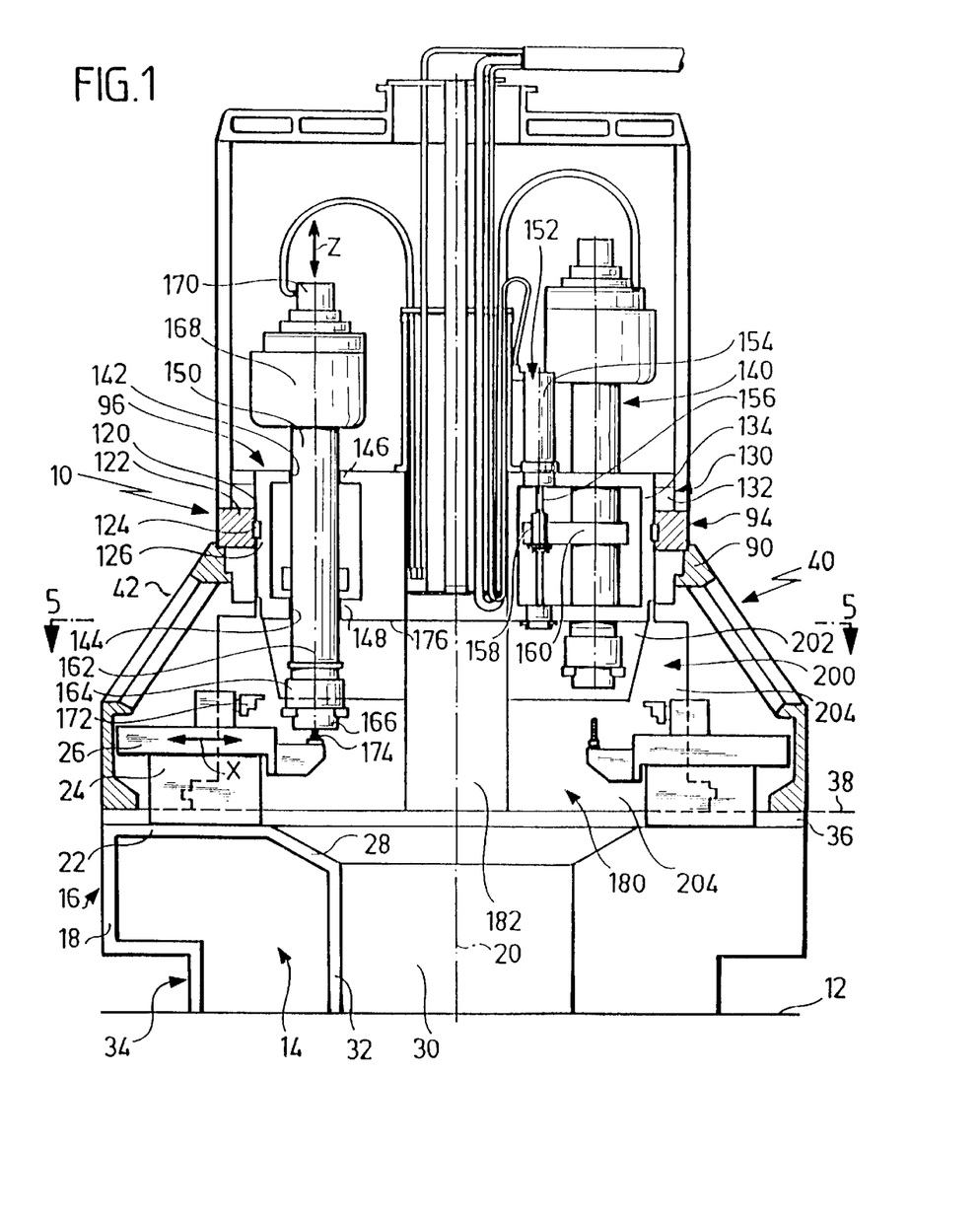
FIG. 1 shows a vertical section through an inventive machine tool.

One embodiment of an inventive machine tool, in particular, a multiple-spindle machine tool comprises a machine frame which is designated as a whole as 10 and has an underframe 14 standing on a base surface 12.

The underframe 14 comprises, on the one hand, an outer ring member 16 with a wall 18 which extends cylindrically to an axis 20 which is arranged centrally of the underframe 14, is approximately at right angles to the base surface 12 and penetrates this.

Support desks 22 preferably extend from the wall 18 of the ring member 16 in radial direction towards the central axis 20 and slide guide means 24 are arranged thereon with tool slides 26 arranged on them. The support desks 22 extend as far as a chippings run-off wall 28 which drops conically towards the central axis 20 and guides chippings falling onto it to a chippings pan 30 which extends around the axis 20 and is limited by an inner wall 32 of the underframe 14.

Furthermore, the underframe 14 preferably has a foot section 34 which is set back radially inwards in the direction of the axis 20 in relation to the wall 18 and with which it stands on the base surface 12.

The underframe 14 has, in addition, a supporting ring 36 borne by the ring member 16 for a machine column ("machine stand") which is designated as a whole as 40, is seated on this supporting ring 36 and separable from the underframe 14 by a plane of separation 38 preferably extending at right angles to the axis 20.

Figure 2:
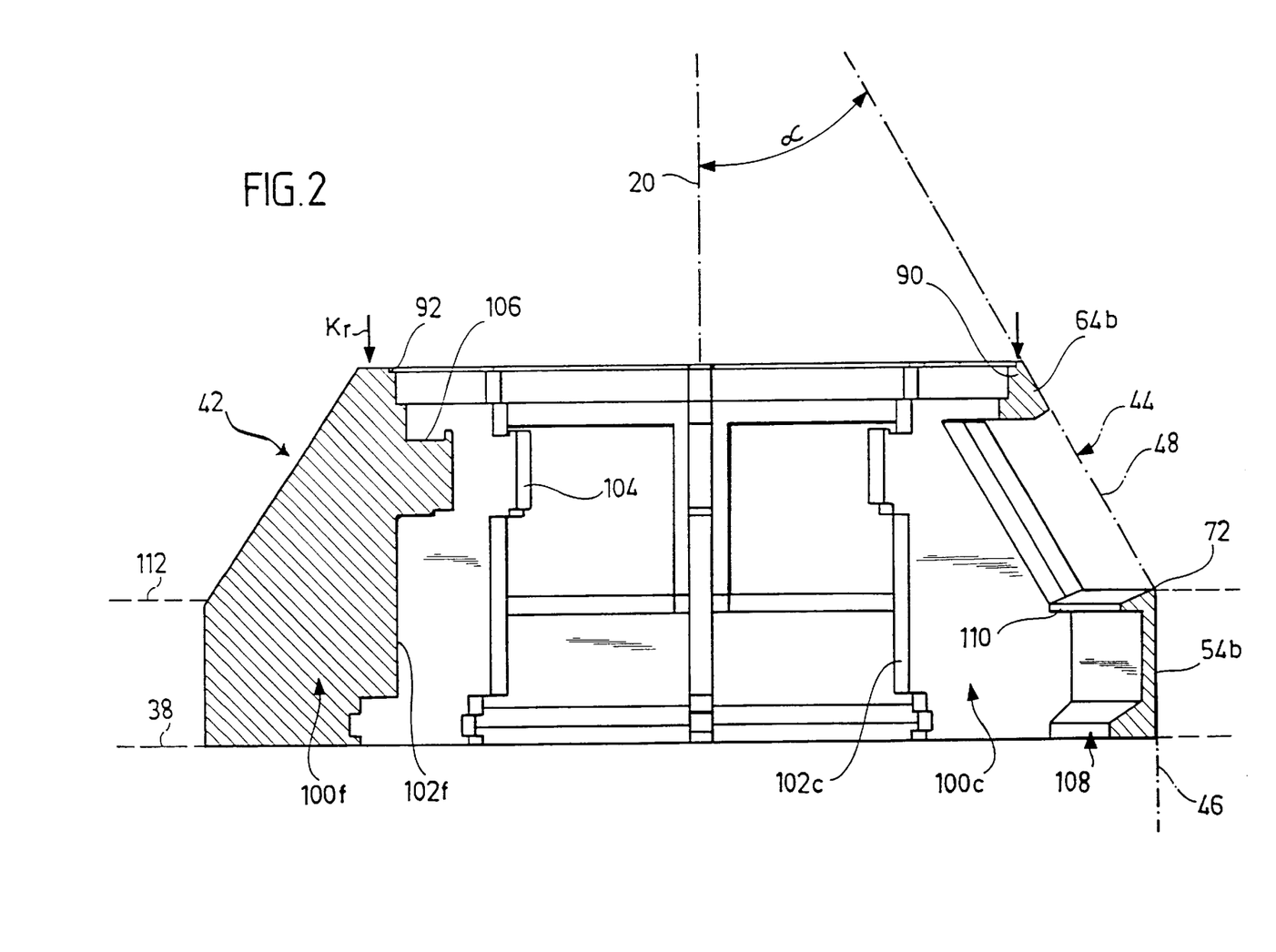
FIG. 2 shows a section along line 2—2 in FIG. 3 through a machine column of the inventive machine tool.
Figure 3:
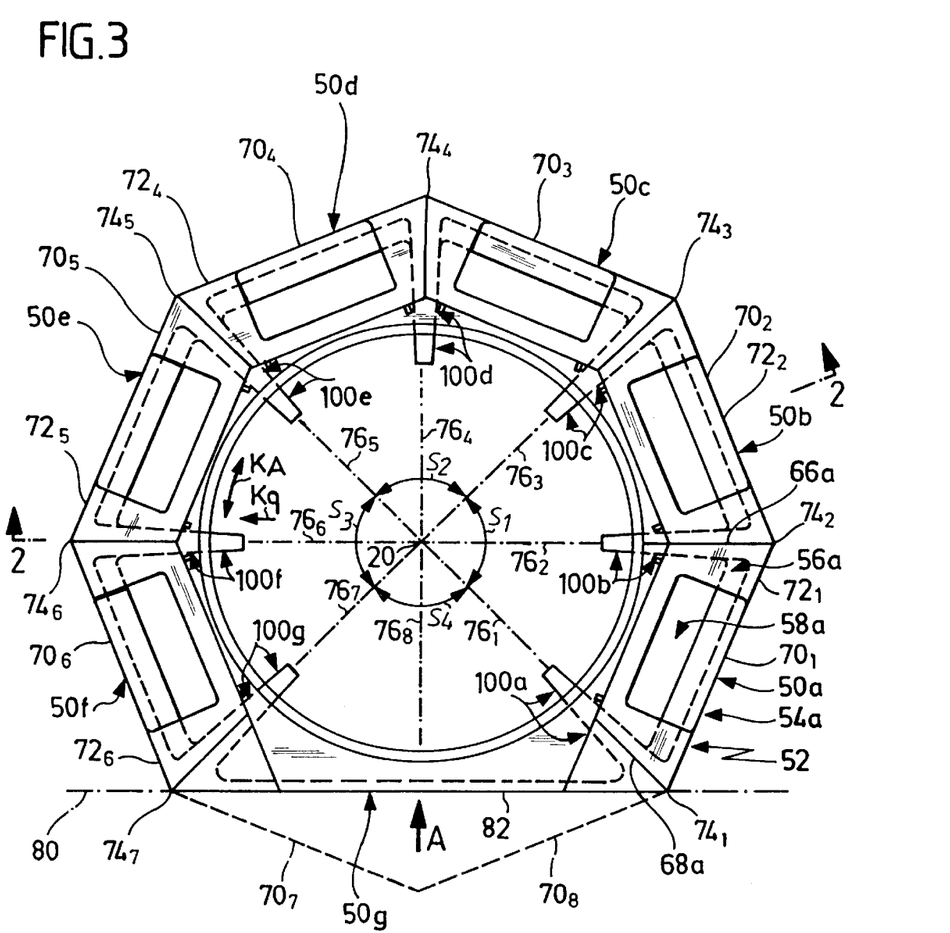
FIG. 3 shows a plan view from above of a machine column of the inventive machine tool.
Figure 4:
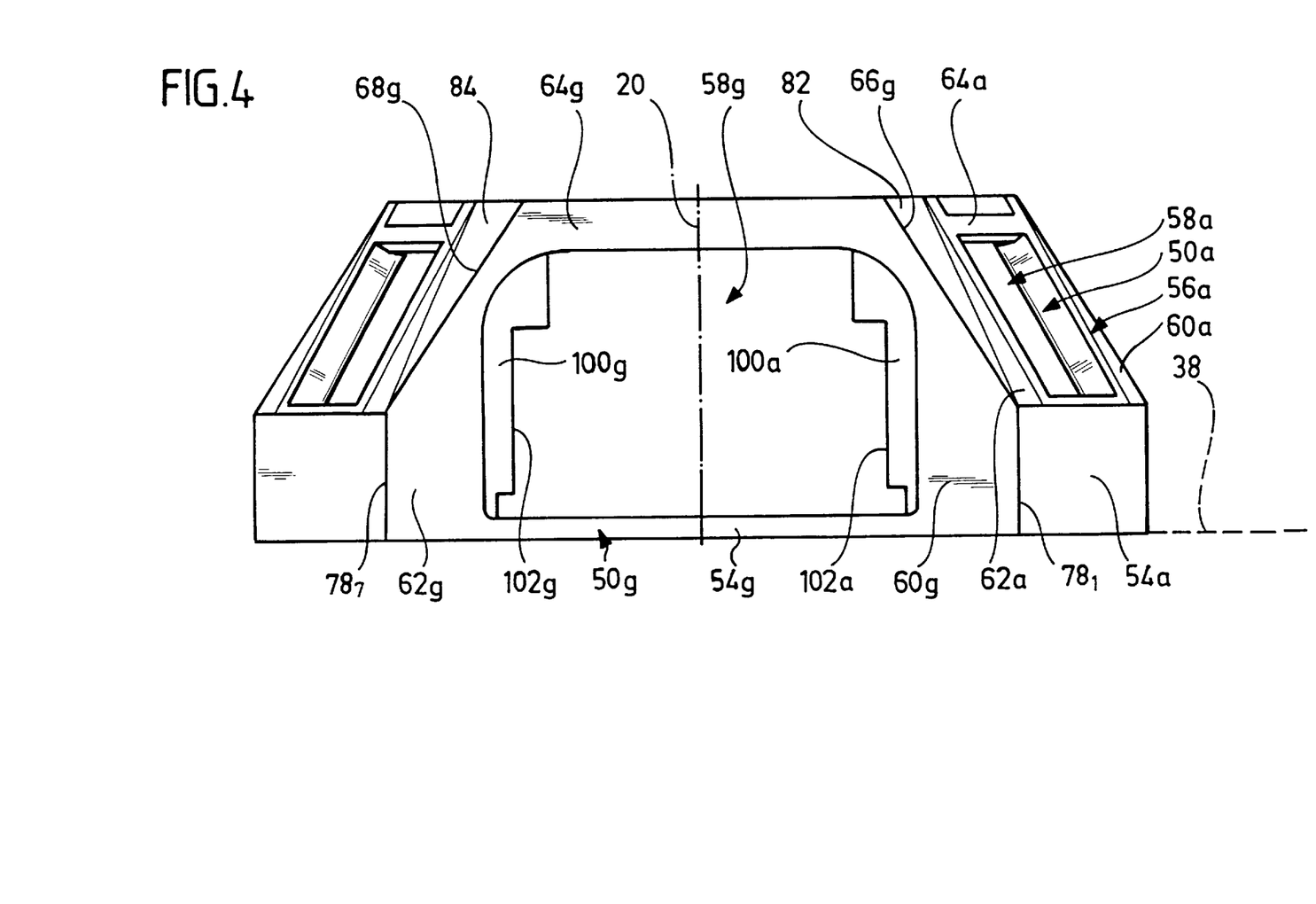
FIG. 4 shows a side view in the direction of arrow A in FIG. 3.

The machine column 40 comprises, as illustrated in FIGS. 2, 3 and 4, a reinforcement casing which is designated as a whole as 42 and has individual casing supporting structure elements 50a to 50g which are connected to one another to form a casing surface supporting structure designated as a whole as 52 and are located in a casing surface 44 which extends around the axis 20 and is formed, on the one hand, from a casing section 46 extending prismatically in relation to the axis 20 and, on the other hand, a conical casing section 48 extending with a cone angle α in relation to the axis 20.

The individual casing supporting structure elements 50a to 50f are of an identical design to one another and comprise a lower wall section 54a, which is located in the area of the prismatic casing section 46 and extends approximately parallel to the axis 20, and an upper frame section 56a which encloses an opening 58a with two lateral flat struts 60a and 62a located on either side of the opening 58a and one upper flat strut 64a extending transversely to these and limiting the opening 58a at its upper side, wherein the lateral flat struts 60a and 62a adjoin the wall section 54a which limits the opening 58a at its lower side. All the flat struts 60a, 62a and 64a as well as the wall section 54a are, in addition, integrally connected to one another and extend laterally of the opening 58a as far as edges 66a and 68a of the casing surface 44.

The casing surface 44 is preferably designed such that in the region of its prismatic casing section 46, insofar as the casing supporting structure elements 50a to 50f are concerned, it has from a base surface of a regular polygon, for example as illustrated in FIG. 3, a base surface of a regular octagon with the side edges $70_1$ to $70_8$ so that the prismatic casing section 46 rises up from the regular octagon with the side edges $70_1$ to $70_6$, wherein in the case of the inventive casing surface 44 the side edges $70_7$ and $70_8$ are missing, as will be explained in detail later on, but the side edges $70_1$ to $70_6$ form the base surface in the region of the casing supporting structure elements 50a to 50f.

Thus, in the region of the prismatic casing section 46 proceeding from the side edges $70_1$ to $70_6$ of the regular octagon the casing surface 44 is formed by plane surfaces extending, on the one hand, parallel to the axis 20 and, on the other hand, parallel to the side edges $70_1$ to $70_6$, the wall sections 54 of the individual surface supporting structure elements 50 being aligned parallel to these plane surfaces.

Furthermore, for forming the casing surface 44 the base surface of the regular octagon with the side edges $70_1$ to $70_6$ is continued in the conical casing section 48 so that the casing surface 44 has in the region of the casing supporting structure elements 50a to 50f plane surfaces which extend, on the one hand, at an angle α in relation to the axis 20 each time and, on the other hand, parallel to the side edges $70_1$ to $70_6$ of the regular octagon and adjoin the surfaces of the prismatic casing section 46, thereby forming an edge $72_1$ to $72_6$ extending azimuthally around the axis 20.

In addition, the casing surface 44 forms, proceeding from corner points $74_1$ to $74_7$ of the side edges $70_1$ to $70_6$ of the regular octagon, edges $78_1$ to $78_7$ extending in radial planes $76_1$ to $76_7$ in relation to the axis 20 which extend to the corner points $74_1$ to $74_7$, the edges $78_1$ to $78_7$ extending first of all parallel to the axis 20 in the region of the prismatic casing section 46 and then at the angle α to the axis 20 in the region of the conical casing section 48.

The side edges 66a and 68a of each of the casing supporting structure elements 50a to f then coincide with two such respective, consecutive edges $78_1$ to $78_7$.

In contrast to the casing supporting structure elements 50a to 50f, the casing supporting structure element 50g, illustrated, in particular, in FIG. 4, replaces two sections of the regular octagon which would correspond to the side edges $70_7$ and $70_8$ of the regular octagon.

The casing surface 44 therefore has in the region of the casing supporting structure element 50g a surface 82 which is located in a plane 80 extending parallel to the axis 20 and through the corner points $74_7$ and $74_1$ and in which the opening 58g is located and flat struts 54g, 60g and 62g as well as 64g surrounding the opening 58g, wherein the flat strut 54g forms the lower flat strut limiting the opening 58g, the flat struts 60g and 62g form the lateral flat struts which limit the opening 58g to the side and the flat strut 64g forms the upper flat strut which limits the opening 58g on an upper side.

In contrast to the casing supporting structure elements 50a to 50f, the extension of the lower flat strut 54g in the direction of the axis 20 is considerably less than the extension of the wall section 54a to 54f of the respective casing supporting structure elements 50a to 50f and so the opening 58a extends closer to the plane of separation 38 in the case of the casing supporting structure element 50g than the openings 58a to 58f.

Furthermore, the upper flat strut 64g of the casing supporting structure element 50g is designed such that it has approximately the same extension in the direction of the axis 20 as the upper flat struts 64a to 64f of the casing supporting structure elements 50a to 50f.

The lateral flat struts 62g and 60g extend with their side edges 66g and 68g as far as the sections of the edges $78_7$ and $78_1$ extending parallel to the axis 20 but, proceeding from the circumferential edge $72_6$ and $72_1$, extend at an increasing distance from the sections of the edges $78_7$ and $78_1$ extending at the angle α to the axis 20 so that a triangular wall piece 82, 84 of the casing supporting structure element 50g is located between them which forms the connection to the casing supporting structure elements 50f and 50a in this region.

All the casing supporting structure elements 50a to 50g extend from the plane of separation 38 as far as a support ring 90 which is apparent in FIG. 2 and integrally formed on the upper flat struts 64 and which has a receiving means 92 extending annularly around the axis 20 for a ring bearing 94 of a support ("carrier") 96 to be described in detail later on.

For the additional reinforcement of the casing surface supporting structure 52 formed by all the casing supporting structure elements 50a to 50g, transverse supporting structure elements 100a to 100g arranged within this supporting structure are provided and these extend transversely to the casing surface 44 and are preferably arranged parallel and symmetrically to the radial planes $76_1$ to $76_7$ which extend, through the respective corner points $74_1$ to $74_7$.

The transverse supporting structure elements 100a to 100g are preferably designed as walls or ribs which are integrally formed on the casing surface supporting structure 52, extend parallel to the radial planes $76_1$ to $76_7$ radially inwards in the direction of the axis, extend from the plane of separation 38 in the direction of the axis 20 as far as the support ring 90 and also, proceeding from the casing surface supporting structure 52, extend radially inwards to such an extent that inner edges 102 thereof have approximately a radial distance from the axis 20 which corresponds approximately to the diameter of the receiving means 92. The inner edges 102 preferably extend approximately parallel to the axis 20 as far as projections 104 of the transverse supporting structure elements 100 which protrude radially inwards beyond the inner edges 102 and form receiving means 106 for cable channels.

In addition, the casing surface supporting structure 52 is provided close to the plane of separation 38 with a circumferential ring of reinforcing struts 108, this ring being integrally formed on the casing supporting structure elements 50a to 50g on an inner side thereof and the reinforcing struts each extending from transverse supporting structure element 100 to transverse supporting structure element 100 on an inner side of the wall sections 54 in the form of a bead which projects radially inwards and forming a ring which extends completely around the axis 20 and follows, on the one hand, the side edges 70₁ to 70₆ of the octagon and, on the other hand, between the corner points 74₇ and 74₁ of the plane 80.

Furthermore, additional reinforcing struts 110 extending parallel to the reinforcing struts 108 are provided in the region of the casing supporting structure elements 50*a* to 50*f* and these each extend around the axis 20 at the level of a lower edge of the openings 58*a* to 58*f* and each adjoin the lateral flat struts 60*g* and 62*g*.

These reinforcing struts 110 also extend preferably parallel to a plane 112 which extends approximately parallel to the plane of separation 38 and at right angles to the axis 20 in the same way as the plane of separation 38.

The machine column 40 formed from the casing surface supporting structure 52 and the transverse supporting structure elements 100 is now in a position to transfer to the underframe 14 not only forces $K_v$ acting on the receiving means 92 parallel to the axis and extending essentially vertically but also transverse forces $K_q$ directed transversely to the axis 20, wherein the transfer of the forces takes place not only via the casing surface supporting structure 52 but also via the transverse supporting structure elements 100, and also forces $K_A$ which are directed in azimuthal direction in relation to the axis 20 and act on the receiving means 92, wherein the transfer of these forces $K_A$ to the underframe 14 takes places essentially through the casing surface supporting structure 52.

The entire machine column 40 is a construction rigid against deformation with respect to the possibly varying forces $K_v$, $K_q$ and $K_A$.

In order to ensure, in particular, a symmetrical rigidity against deformation in relation to the axis 20, the casing supporting structure elements 50*a* to 50*g* are dimensioned in conjunction with the transverse supporting structure elements 100*a* to 100*g* such that they form, with respect to the rigidity in relation to the forces $K_A$, $K_q$ and $K_v$, a body having a multiple symmetry in relation to the axis 20.

For example, the dimensioning of the casing supporting structure elements 50*a* to 50*f* with the corresponding transverse supporting structure elements 100*a* to 100*g* is, in the case of the present embodiment, selected such that the casing supporting structure elements 50*a* and 50*b* form with the transverse supporting structure elements 100*a* to 100*c* a sector $S_1$ which has the same rigidity as a sector $S_2$ formed from the casing supporting structure elements 50*c* and 50*d* with the transverse supporting structure elements 100*c* to 10*e* and likewise have the same rigidity as a sector $S_3$ formed from the casing supporting structure elements 50*e* and 50*f* with the transverse supporting structure elements 100*e* to 100*g* and, in addition, have the same rigidity as a sector $S_4$ formed from the casing supporting structure element 50*g* with the transverse supporting structure elements 100*g* and 100*a* so that, altogether, the machine column 40 forms a body which is formed with respect to its rigidity from four sectors $S_1$ to $S_4$ having an identical rigidity and, consequently, a four-fold symmetry in relation to the axis 20 is present although the base surface deviates from that of a regular octagon in the region of the casing supporting structure element 50*g*.

The support 96 is preferably designed as a spindle drum which is mounted by means of the rotary bearing 94 in the region of its outer circumference 120 so as to be rotatable in relation to the support ring 90. For this purpose, the rotary bearing 94 has an outer bearing ring 122 which is securely connected to the support ring 90 and on which an inner bearing ring non-rotatably connected to the support 96 is mounted by means of bearing members 124 so that the entire support 96 is mounted for rotation about the axis 20 as axis of rotation.

In order to rotate the support 96 about the axis 20, a rotary drive is provided which is designated as a whole as 130 and comprises, for example, a stator 132 which is securely connected to the outer bearing ring 122 and is thus likewise securely fixed on the support ring 90 whereas the support 96 is securely connected to a rotor 134.

For example, the rotary drive 130 is formed from a linear drive, comprising the stator 132 and the rotor 134, which is bent about the axis 20 along a circular arc and offers the possibility of using high driving power during the rotation of the support 96.

In order to secure the support 96 in the individual rotary positions relative to the machine column 40 of the machine frame 10, a Hirth-type tooth system is provided which is not illustrated in detail in the drawings and which makes a precise fixing of the support 96 possible in the individual rotary positions relative to the machine frame 10. For example, the Hirth-type tooth system is provided in the region of the rotary bearing 94.

The support 96 designed as a spindle drum bears several workpiece receiving means 140 which are arranged at constant radial distances around the axis 20 and in constant angular sections relative to one another and, in this case, are designed as workpiece spindles which have spindle sleeves 150 mounted for displacement in Z direction and penetrating openings 142 and 144 in support flanges 146 and 148 of the support 96 parallel to the axis, these spindle sleeves being displaceable in the direction of the Z axis by way of a Z-axis drive 152 securely arranged on the support 96, wherein the Z-axis drive 152 has a drive motor 154 arranged on the support 96 and a threaded spindle 156 arranged on the support 96, the spindle nut 158 of which is mounted in a retaining arm 160 connected to the spindle sleeve 150 so that a displacement of the entire spindle sleeve 150 in the direction of the Z axis relative to the support 96 is brought about due to displacement of the spindle nut 158 over the retaining arm.

Workpiece clamping means 164, in particular, chucks for workpieces 166 are mounted on the spindle sleeves 150 so as to be rotatable about a spindle axis 162 and these workpiece clamping means are, for their part, in a position to receive and clamp the workpieces 166 on their side facing the underframe 14.

The workpiece clamping means 164 are driven via spindle drives 168 arranged on the spindle sleeves 150 preferably on sides thereof located opposite the workpiece clamping means 164 and the workpiece clamping means 164 are actuated by means of cocking cylinders 170 arranged on the spindle sleeves 150 likewise on sides thereof located opposite the workpiece clamping means 164.

Due to movement of the spindle sleeves 150 in the direction of the Z axis, the workpieces 166 are also movable in the direction of the Z axis and thus in the direction towards the underframe 14 and away from it so that a machining of the workpieces 166 is possible by means of tools 172 and 174 which are arranged on the tool slides 26 and this machining takes place due to a numerically controlled movement of the tool slides 26 in an X direction radial to the spindle axis 162 and thus preferably in a plane extending at right angles to the axis 20 relative to the workpiece 166 which is held in the workpiece clamping means 164 and rotates about the spindle axis 162 and which, for its part, is movable in Z direction in a numerically controlled manner due to movement of the spindle sleeve 150.

The workpieces 166 are thereby machined in an operating area which is located between the plane 38 and an end side 176 of the support 96 and extends azimuthally around the axis 20, namely preferably within the casing surface supporting structure 152 and, in addition, within the inner edges 102 of the walls 100, wherein the operating area 180 can extend, in addition, between the walls 100 as far as the casing surface supporting structure 152 in a radial direction to the axis 20.

In addition, an inner limitation of the operating area 180 is brought about by a cylinder wall 182 which extends cylindrically about the axis 20 and serves to prevent any chippings flying transversely to the axis 20.

Figure 5:
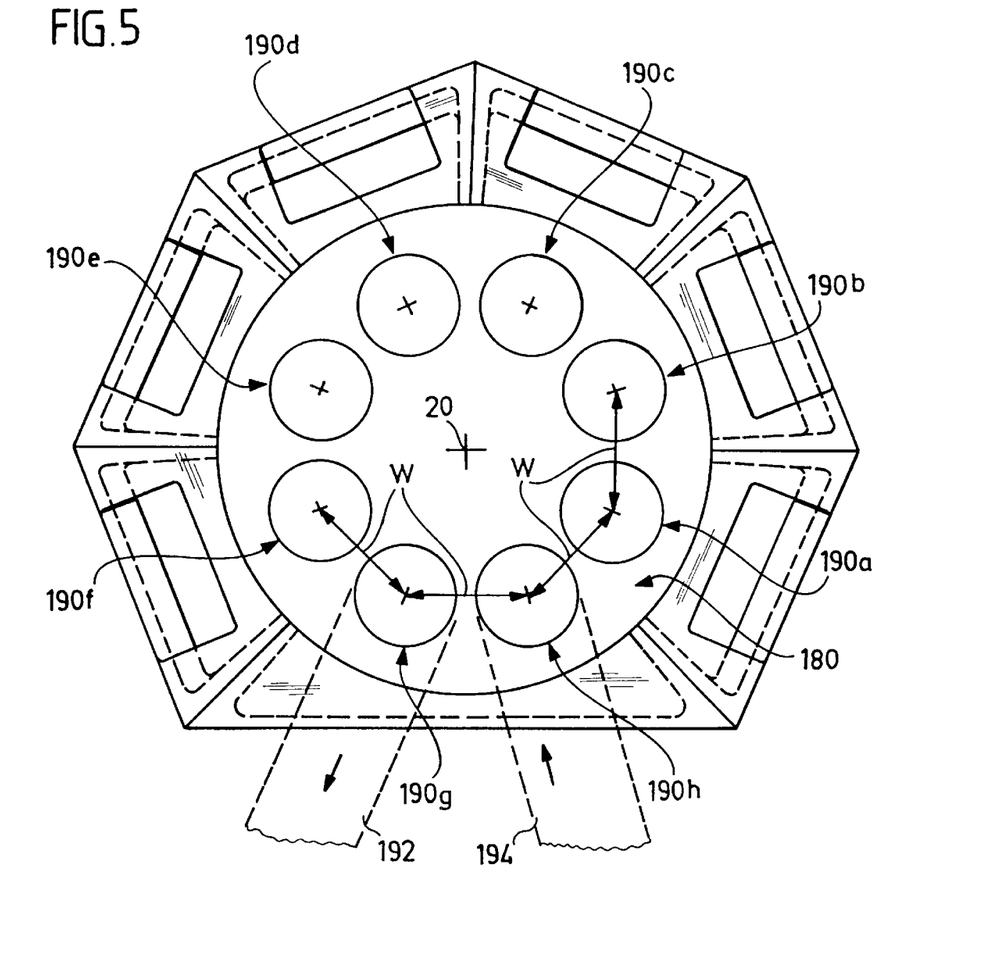
FIG. 5 shows a section along line 5—5 in FIG. 1.

For the machining of the workpieces 166, a plurality of individual spindle positions 190*a* to 190*h* are provided in the operating area 180, as illustrated in FIG. 5, wherein the spindle positions 190*a* to 190*f* are each located symmetrically to an angle bisector between respectively consecutive radial planes $76_{1\ and\ 2}$, $76_{2\ and\ 3}$, $76_{3\ and\ 4}$, $76_{4\ and\ 5}$ and $76_{6\ and\ 7}$ so that the individual spindle stations 190*a* to f have a constant angular distance W from one another.

The additional spindle stations 190*g* and 190*h* also have the same angular distance W, on the one hand, relative to one another and, on the other hand, relative to the respectively preceding and respectively following spindle station so that, altogether, all the spindle stations 190*a* to 190*h* are arranged at the same angular distance from one another and thus a workpiece 166 can be moved through all the spindle stations 190*a* to 190*h* due to rotation of the support 96 through the angular distance W.

For example, the spindle stations 190*a* to 190*f* in the inventive machine tool are designed as machining stations and thus at least one tool 172 or 174 is associated with each spindle station and preferably one tool slide 26 for moving the tool in X direction, as well. The spindle stations 190*g* and 190*h* serve for the loading and unloading of workpieces. For example, the spindle station 190*g* is designed as an unloading station and is provided with a workpiece removal means 192 which is in a position to remove a finished workpiece 166 from the workpiece clamping means 164 located in the spindle station 190*g* and transport it away. In this case, the spindle station 190*h* is, in addition, preferably designed as a loading station and provided with a workpiece supply means 194 which transports unmachined workpieces 166 into the spindle station 190*h* and positions them such that a workpiece clamping means 164 located therein is in a position to receive and clamp the workpiece due to movement of the spindle sleeve 150 associated therewith in Z direction so that, subsequently, the workpiece 166 can be transported through the individual machining stations 190*a* to 190*f* and machined.

In the individual machining stations 190*a* to 190*f*, the openings 58*a* to 58*f* respectively provided in them in the casing supporting structure elements 50*a* to 50*f* serve to make access to the tools 172 and/or 174 in these stations as well as the tool slides 26 possible and, where applicable, also to the workpieces 166 located in these machining stations. For this reason, the openings 58*a* to *f* are located such that at least one access to the tools 172 and 174 seated on the tool slide 26 is possible, wherein the tool slide 26 is arranged at a level above the plane of separation 38 such that it is located in the region of the respective wall sections 54*a* to 54*f*.

The enlarged opening 58*g* in the region of the casing supporting structure element 50*g* serves to facilitate assembly of the workpiece supply means 192 and the workpiece removal means 194 and to create sufficient space for the assembly of them which then respectively extend in the direction of the axis 20 as far as the corresponding spindle station 190*g* and 190*h*.

Figure 6:
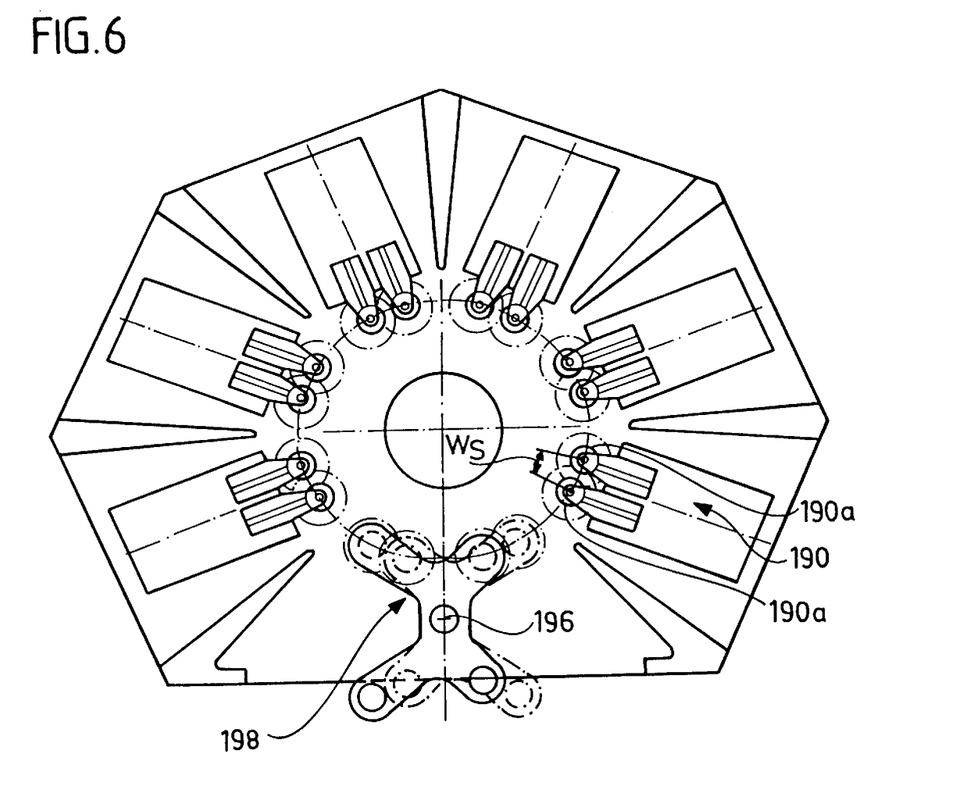
FIG. 6 shows a section similar to FIG. 5 through a variation of the illustrated embodiment.

In a variation of the inventive machine tool, illustrated in FIG. 6, two substations $190a_1$ and $190a_2$ to $190h_1$ and $190h_2$ arranged at a small angular distance WS from one another are associated with each individual spindle station 190*a* to 190*h*, wherein the most varied of possibilities for the machining are thereby given in the corresponding machining stations 190*a* to 190*f*, as described, for example, in German patent application 196 07 883.0-14.

In order to provide access to the substations $190g_1$ and $190g_2$ or $190h_1$ and $190h_2$ not only in the unloading station 190*g* but also in the loading station 190*h*, a pivoting device 198 is provided which is pivotable about a pivot axis 196 parallel to the axis 20 and in one pivot position is in a position to serve the substations $190g_1$ and $190h_1$ and in the other pivot position the substations $190g_2$ and $190h_2$.

Furthermore, in order to prevent any chippings flying between the individual machining stations 190*a* to 190*f* and also to the unloading station 190*g* and the loading station 190*h*, an additional subdivision of the operating area 180 by chippings protection walls 200 is provided, wherein one subwall 202 of the chippings protection wall 200 is securely connected to the support 96 and located in one of the radial planes $76_1$ and $76_8$ when the workpiece spindles 140 are in the spindle stations 190 whereas one subwall 204 of the chippings protection walls 200 is located in one of the respective radial planes $76_1$ to $76_7$ so that when the workpiece spindles 140 are in their spindle stations 190 the individual machining stations 190*a* to 190*f* are separated from one another by the chippings protection walls 200 which extend in the respective radial planes $76_1$ to $76_7$ and this prevents any reciprocal flying of chippings.

What is claimed is:

1. A machine tool comprising:

a machine frame with an underframe, a machine stand seated on the underframe and having a support ring, a carrier mounted on the support ring for rotation about an essentially vertical axis, said carrier having a plurality of workpiece receiving means arranged thereon for receiving workpieces to be machined, an operating area extending around said vertical axis, the workpiece receiving means being movable around the vertical axis in said operating area due to rotation of said carrier, and a plurality of stations arranged on the machine frame in the region of the operating area, said workpiece receiving means being positionable in said stations during a machining cycle, wherein:

the machine stand has a reinforcement casing that fixes the support ring in relation to the underframe, said casing extends outside the operating area and at least partially surrounds the operating area at its peripheral side facing away from said vertical axis and thereby forms a casing surface extending at least half way around said vertical axis, the casing comprises casing supporting structure elements extending in said casing surface, said supporting structure elements absorbing forces that act in the casing surface and are transferred from the support ring in a manner rigid against deformation, and said supporting structure elements are connected with one another to form a casing surface supporting structure that is rigid against deformation.

2. A machine tool as defined in claim 1, wherein the reinforcement casing has several openings, the operating area being accessible via said openings.

3. A machine tool as defined in claim 2, wherein the operating area is accessible exclusively via the openings in the reinforcement casing.

4. A machine tool as defined in claim 2, wherein an opening in the reinforcement casing is associated with each station.

5. A machine tool as defined in claim 3, wherein:
the stations comprise machining stations, and
a tool carrier provided in each machining station is accessible from the outside via one of the openings.

6. A machine tool as defined in claim 5, wherein each machining station has its own opening associated with it.

7. A machine tool as defined in claim 2, wherein each of the casing supporting structure elements extends at least partially around one of the openings.

8. A machine tool as defined in claim 1, wherein each casing supporting structure element comprises connected flat struts extending areally parallel to the casing surface.

9. A machine tool as defined in claim 8, wherein the flat struts have uninterrupted surfaces within their outer contour.

10. A machine tool as defined in claim 8, wherein the flat struts of each casing supporting structure element form a connected, integral part.

11. A machine tool as defined in claim 8, wherein the flat struts of each casing supporting structure element form a frame surrounding the opening.

12. A machine tool as defined in claim 1, wherein at least one section of the casing surface is designed, at least over part of the circumference of the reinforcement casing, similar to an area of a surface prismatically parallel to the vertical axis.

13. A machine tool as defined in claim 12, wherein the casing surface has a polygonal base surface continuing into the casing surface in edges extending away from the base surface.

14. A machine tool as defined in claim 13, wherein part of the base surface of the casing surface has the shape of a regular polygon.

15. A machine tool as defined in claim 13, wherein one casing supporting structure element extends each time between two corners of the polygonal base surface following one another in a circumferential direction.

16. A machine tool as defined in claim 1, wherein at least one section of the casing surface is designed, at least over part of the circumference of the reinforcement casing, similar to an area of a conical surface with a cone axis extending parallel to the vertical axis.

17. A machine tool as defined in claim 16, wherein the casing surface has a polygonal base surface continuing into the casing surface in edges extending away from the base surface.

18. A machine tool as defined in claim 17, wherein part of the base surface of the casing surface has the shape of a regular polygon.

19. A machine tool as defined in claim 17, wherein one casing supporting structure element extends each time between two corners of the polygonal base surface following one another in a circumferential direction.

20. A machine tool as defined in claim 1, wherein:
the support ring is held in a fixed position in relation to the underframe by transverse supporting structure elements extending in transverse planes approximately parallel to the vertical axis and transverse to the casing surface,
said transverse supporting structure elements absorbing forces acting in these transverse planes and transferred from the support ring in a manner rigid against deformation.

21. A machine tool as defined in claim 20, wherein the transverse planes extend parallel to radial directions in relation to the vertical axis.

22. A machine tool as defined in claim 20, wherein the transverse supporting structure elements extend areally parallel to the transverse planes.

23. A machine tool as defined in claim 22, wherein the transverse supporting structure elements are designed as closed wall elements.

24. A machine tool as defined in claim 20, wherein the transverse supporting structure elements are integrally connected to the casing surface supporting structure.

25. A machine tool as defined in claim 20, wherein the transverse supporting structure elements are each arranged between two stations in azimuthal direction in relation to the vertical axis.

26. A machine tool as defined in claim 25, wherein the transverse supporting structure elements are arranged between all the machining stations.

27. A machine tool as defined in claim 20, wherein the transverse supporting structure elements are arranged within the casing surface supporting structure.

28. A machine tool as defined in claim 1, wherein the casing surface supporting structure is provided with reinforcing struts extending at least partially in an azimuthal direction.

29. A machine tool as defined in claim 28, wherein the reinforcing struts are located in a plane extending transversely to the vertical axis.

30. A machine tool as defined in claim 28, wherein the reinforcing struts each extend as far as the transverse supporting structure elements and are connected to the transverse supporting structure elements.

31. A machine tool as defined in claim 28, wherein the reinforcing struts are integrally connected to the casing surface supporting structure.

32. A machine tool as defined in claim 1, wherein the machine stand is dimensioned to have, with respect to its rigidity, a multiple symmetry in relation to the vertical axis.

33. A machine tool as defined in claim 3, wherein:
the stations comprise a loading station with a workpiece transport unit extending through the loading station opening.

34. A machine tool as defined in claim 3, wherein:
the stations comprise an unloading station with a workpiece transport unit extending through the unloading station opening.

35. A machine tool as defined in claim 3, wherein:
the stations comprise a loading station with a workpiece transport unit extending through the loading station opening, and
an unloading station with a workpiece transport unit extending through the unloading station opening.

* * * * *